US009468006B2

(12) United States Patent
Cheng

(10) Patent No.: US 9,468,006 B2
(45) Date of Patent: Oct. 11, 2016

(54) METHOD OF DETERMINING TRANSIT POWER FOR DATA TRANSMISSION BETWEEN A NETWORK AND A USER EQUIPMENT AND RELATED WIRELESS COMMUNICATION SYSTEM

(71) Applicant: ACER INCORPORATED, New Taipei (TW)

(72) Inventor: Tsung-Yo Cheng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 143 days.

(21) Appl. No.: 14/565,406

(22) Filed: Dec. 9, 2014

(65) Prior Publication Data
US 2016/0165614 A1    Jun. 9, 2016

(51) Int. Cl.
*H04W 4/00*      (2009.01)
*H04W 72/04*     (2009.01)
*H04W 52/38*     (2009.01)
*H04W 52/40*     (2009.01)
*H04W 52/44*     (2009.01)
*H04W 52/50*     (2009.01)

(52) U.S. Cl.
CPC ......... *H04W 72/0473* (2013.01); *H04W 52/38* (2013.01); *H04W 72/042* (2013.01); *H04W 52/40* (2013.01); *H04W 52/44* (2013.01); *H04W 52/50* (2013.01)

(58) Field of Classification Search
None
See application file for complete search history.

(56) References Cited

U.S. PATENT DOCUMENTS

2009/0290559 A1*  11/2009  Pelletier .................. H04L 1/189
                                                                370/336
2012/0113797 A1*  5/2012   De Pasquale ........ H04B 7/0628
                                                                370/216
2015/0237588 A1*  8/2015   Zhao ..................... H04W 24/08
                                                                455/127.2

FOREIGN PATENT DOCUMENTS

TW          201014412 A1     4/2010

OTHER PUBLICATIONS

R1-071783, "Introduction of 16-QAM for HSUPA", 3GPP TSG-RAN-@G! Meeting #48, Mar. 2007.*
R1-074652, "Clarification on E-DPDCH power extrapolation/interpolation", 3GPP TSG RAN WG1 meeting #51, Nov. 2007.*
R2-075390, "Clarification on E-DPDCH power extrapolation/interpolation", 3GPP TSG RAN WG2 meeting #60, Nov. 2007.*

(Continued)

*Primary Examiner* — Christopher Crutchfield
*Assistant Examiner* — Thinh Tran
(74) *Attorney, Agent, or Firm* — Winston Hsu; Scott Margo

(57) ABSTRACT

In a wireless communication system, a network initiates a radio bearer reconfiguration procedure by sending an RADIO BEARER RECONFIGURATION message to a user equipment. Then, the network initiates an active set update procedure by sending an ACTIVE SET UPDATE message to the user equipment. When detecting an inconsistency in the E-DPDCH power interpolation information elements indicated in the RADIO BEARER RECONFIGURATION message and the ACTIVE SET UPDATE message, the user equipment computes a first gain factor using an extrapolation formula. When unable to transmit data based on the first gain factor, the user equipment computes a second gain factor using an interpolation formula. If the data cannot be transmitted based on the second gain factor, the user equipment notifies the network of an unsuccessful radio link.

10 Claims, 2 Drawing Sheets

(56) References Cited

OTHER PUBLICATIONS

3GPP TS 25.331 V12.3.0 (Sep. 2014), 3rd Generation Partnership Project; Technical Specification Group Radio Access Network; Radio Resource Control (RRC); Protocol specification (Release 12), pp. 626-630, 1056, Sep. 23, 2014.

Broadcom Corporation, Ericsson, Correction to the handling of "IE E-DPDCH power interpolation" when absent, 3GPP TSG-RAN2 Meeting#86, R2-141927, Seoul, South Korea, May 19-23, 2014.

3GPP TS 25.214 V11.10.0 (Sep. 2014), 3rd Generation Partnership Project; Technical Specification Group Radio Access Network; Physical layer procedures (FDD) (Release 11).

* cited by examiner

METHOD OF DETERMINING TRANSIT POWER FOR DATA TRANSMISSION BETWEEN A NETWORK AND A USER EQUIPMENT AND RELATED WIRELESS COMMUNICATION SYSTEM

BACKGROUND OF THE INVENTION

1. Field of the Invention

The present invention is related to a method of determining transit power for data transmission between a network and a user equipment and related wireless communication system, and more particularly, to a method of determining transit power for data transmission between a network and a user equipment by automatically using an extrapolation formula and an interpolation formula for computing E-DPDCH gain factor and related wireless communication system.

2. Description of the Prior Art

The 3rd Generation Partnership Project (3GPP) has developed various wireless communication networks. A universal mobile telecommunications system (UMTS) is a $3^{rd}$ generation (3G) network which adopts a wideband code division multiple access (WCDMA) technology capable of providing high frequency spectrum utilization, universal coverage, and high-speed/quality multimedia data transmission. In the UMTS network, a radio access network known as a universal terrestrial radio access network (UTRAN) includes multiple base stations, commonly known as Node-Bs (NBs), for communicating with multiple user equipment (UE). A long-term evolution (LTE) system is a $4^{th}$ generation (4G) network which includes a new radio interface and radio network architecture capable of providing a high data rate, low latency, packet optimization, and improved system capacity and coverage. In the LTE network, a radio access network known as an evolved UTRAN (E-UTRAN) includes multiple evolved NBs (eNBs) for communicating with multiple UEs and a core network which includes a mobility management entity (MME), a serving gateway and other devices for NAS (Non Access Stratum) control.

A UE may communicate with a wireless communication network using various channels. In the UMTS network, an enhanced dedicated channel (E-DCH) has been introduced in the uplink transmission. The E-DCH is associated with an enhanced dedicated physical data channel (E-DPDCH) and an enhanced dedicated physical control channel (E-DPCCH). During registration, the UE and the network may exchange capability lists, each of which allows the recipient entity (the UE or the network) to know which capabilities the sending entity (the network or the UE) supports and thus which capabilities and features may be invoked and used for various services.

The UE and the network are required to operate according to 3GPP specifications which are structured as various release versions. Additional capabilities or modified functions are made available in each newer release version of 3GPP specifications. Existing 3GPP specifications fail to include the consistency of certain features, such as power interpolation/extrapolation. For example, the network may send a RADIO BEARER RECONFIGURATION message to instruct the UE to use an interpolation formula when calculating the gain factor of the E-DPDCH. Later, the network may send an ACTIVE SET UPDATE message to update the active set of the connection between the UE and the network. If the ACTIVE SET UPDATE message does not include any information about power interpolation/extrapolation, the UE detects this inconsistency and thus uses an extrapolation formula when calculating the gain factor of the E-DPDCH. Under such circumstance, radio link failure may occur when the UE uses an inappropriate gain factor for data transmission.

SUMMARY OF THE INVENTION

The present invention provides a method of determining transit power for data transmission between a network and a user equipment. The method includes the network sending a first message to the UE, wherein the first message is associated with a radio bearer reconfiguration procedure and includes a first information element associated with an interpolation formula; the network sending a second message to the UE, wherein the second message is associated with updating an active set of the user equipment; the user equipment computing a first gain factor using an extrapolation formula if the second message does not include a second information element associated with the interpolation formula; the UE computing a second gain factor using the interpolation formula if data cannot be transmitted based on the first gain factor; and the UE transmitting the data based on the second gain factor.

The present invention also provides a wireless communication system having a network and a user equipment for determining transit power. The network is configured to send a first message and a second message, wherein the first message is associated with a radio bearer reconfiguration procedure and includes a first information element associated with an interpolation formula and the second message is associated with updating an active set. The user equipment includes a connecting unit, a computing unit and a processing unit. The connecting unit is configured to communicate with the network for receiving the first message and the second message and transmit data based on a first gain factor or a second gain factor. The computing unit id configured to compute the first gain factor using an extrapolation formula and compute the second gain factor using the interpolation formula. The processing unit is configured to determine if the second message includes a second information element associated with the interpolation formula, determine if data can be transmitted based on the first gain factor when a serving grant reaches a predetermined value, determine if the data can be transmitted based on the second gain factor when a timer expires, and instruct the connecting unit to send a message to notify the network of a successful radio link or an unsuccessful radio link.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
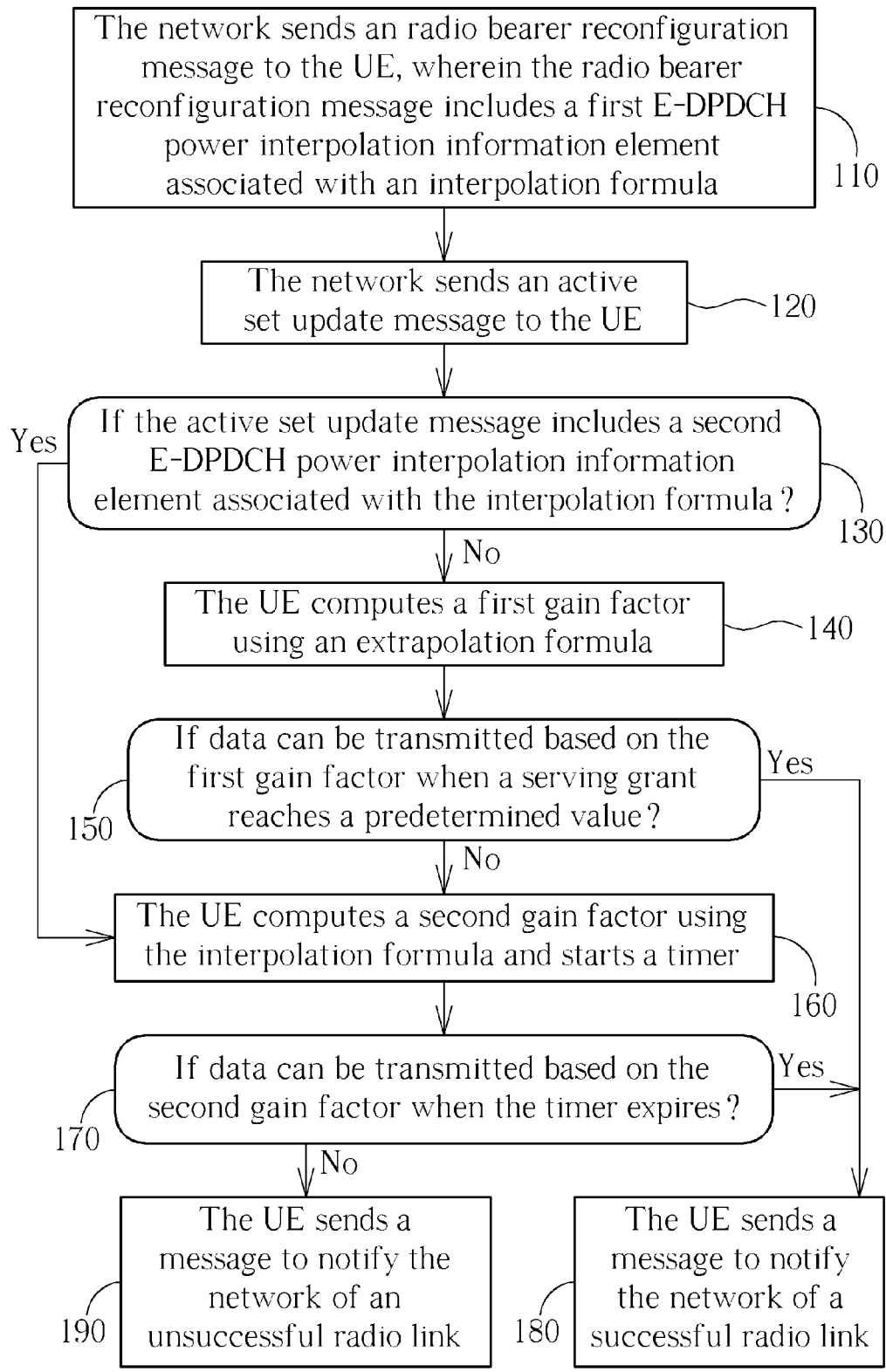
FIG. 1 is a flowchart illustrating a method of determining transit power for data transmission between a network and a user equipment according to the present invention.

FIG. 1 is a flowchart illustrating a method of determining transit power for data transmission between a network and a user equipment according to the present invention. The flowchart in FIG. 1 includes the following steps:

Step 110: the network sends a RADIO BEARER RECONFIGURATION message to the UE, wherein the RADIO BEARER RECONFIGURATION message includes a first E-DPDCH power interpolation information element associated with an interpolation formula; execute step 120.

Step 120: the network sends an ACTIVE SET UPDATE message to the UE; execute step 130.

Step 130: the UE determines if the ACTIVE SET UPDATE message includes a second E-DPDCH power interpolation information element associated with the interpolation formula; if yes, execute step 160; if no, execute step 140.

Step 140: the UE computes a first gain factor using an extrapolation formula; execute step 150.

Step 150: the UE determines if data can be transmitted based on the first gain factor when a serving grant reaches a predetermined value; if yes, execute step 180; if no, execute step 160.

Step 160: the UE computes a second gain factor using the interpolation formula and starts a timer; execute step 170.

Step 170: the UE determines if data can be transmitted based on the second gain factor when the timer expires; if yes, execute step 180; if no, execute step 190.

Step 180: the UE sends a message to notify the network of a successful radio link.

Step 190: the UE sends a message to notify the network of an unsuccessful radio link.

According to the 3GPP specification TS 25.331, a radio bearer (RB) reconfiguration procedure is used for reconfigure parameters for a radio bearer. To initiate the radio bearer reconfiguration procedure, the RADIO BEARER RECONFIGURATION message is transmitted on the downlink dedicated control channel (DCCH) in order to reconfigure parameters related to a change in Quality of Service (QoS) or to release and setup a radio bearer, change the multiplexing of media access control (MAC), reconfigure transport channels and physical channels, or perform a handover. The RADIO BEARER RECONFIGURATION message includes multiple information elements and group names, such as UE information elements, CN information elements, UTRAN mobility information elements, RB information elements, TrCH information elements, uplink transport channels, downlink transport channels, PhyCH information elements, uplink radio resources, downlink radio resources.

The E-DCH information associated with the uplink radio resources in the RADIO BEARER RECONFIGURATION message includes E-DPCCH information and E-DPDCH information. E-DPCCH information includes information elements associated with E-DPCCH/DPCCH power offset, happy bit delay condition, E-TFC boost information and E-DPDCH power interpolation. When receiving the RADIO BEARER RECONFIGURATION message with the E-DPDCH power interpolation information element set to TRUE, the UE is configured to calculate the gain factor of the E-DPDCH using an interpolation formula specified in the 3GPP specification TS 25.214. When receiving the RADIO BEARER RECONFIGURATION message with the E-DPDCH power interpolation information element set to FALSE, the UE is configured to calculate the gain factor of the E-DPDCH using an extrapolation formula specified in the 3GPP specification TS 25.214. In step 110, it is assumed that the first E-DPDCH power interpolation information element is associated with the interpolation formula (set to TRUE).

According to the 3GPP specification TS 25.331, the purpose of the active set update procedure is to update the active set of the connection between the UE and the network. The active set update procedure is initiated when the network sends an ACTIVE SET UPDATE message on the downlink DCCH for ordering the UE to make the following modifications of the active set of the connection:

(a) Radio link addition to the active set;
(b) Radio link removal from the active set;
(c) Combined radio link addition and removal on the active set;
(d) Addition of a radio link to the E-DCH active set;
(e) Removal of a radio link from the E-DCH active set;
(f) Radio link addition to the secondary E-DCH active set;
(g) Radio link removal from the secondary E-DCH active set;
(h) Combined radio link addition and removal on the secondary E-DCH active set.

The ACTIVE SET UPDATE message includes multiple information elements and group names, such as UE information elements, CN information elements, PhyCH information elements, uplink radio resources, and downlink radio resources. Depending on the capabilities of the network, the downlink radio resources in the ACTIVE SET UPDATE message may or may not include an information element associated with E-DPDCH power interpolation. If it is determined in step 130 that the ACTIVE SET UPDATE message does not include the second E-DPDCH power interpolation information element associated with the interpolation formula, step 140 is then executed. If it is determined in step 130 that the ACTIVE SET UPDATE message includes the second E-DPDCH power interpolation information element associated with the interpolation formula, step 160 is then executed.

According to the 3GPP specification TS 25.214, the E-DPDCH power extrapolation formula is represented by the following formula (1) and the E-DPDCH power interpolation formula is represented by the following formula (2):

$$\beta_{ed,i,harq} = \beta_{ed,ref} \sqrt{\frac{L_{e,ref}}{L_{e,i}}} \sqrt{\frac{K_{e,i}}{L_{e,ref}}} \cdot 10^{\left(\frac{\Delta harq}{20}\right)} \quad (1)$$

$$\beta_{ed,i,harq} = \sqrt{\frac{L_{e,ref,1}}{L_{e,i}}} \cdot \sqrt{\left\{\left(\frac{\frac{L_{e,ref,2}}{L_{e,ref,1}}\beta^2_{ed,ref,2} - \beta^2_{ed,ref,1}}{K_{e,ref,2} - K_{e,ref,1}}\right)(K_{e,i} - K_{e,ref,1}) + \beta^2_{ed,ref,1}\right\}} \cdot 10^{\left(\frac{\Delta harq}{20}\right)} \quad (2)$$

In step 140, the UE may compute the first gain factor using the extrapolation formula (1), wherein $\beta_{ed,ref}$ denotes the E-DPDCH gain factor of the reference E-DCH Transport Format Combination (E-TFC); $L_{e,ref}$ denotes the number of E-DPDCHs used for the reference E-TFC; $L_{e,i}$ denotes the number of E-DPDCH used for the $i^{th}$ E-TFC (that is, the $i^{th}$ E-TFC is corresponding to the E-DPDCH whose E-DPDCH gain factor is currently to be obtained); $K_{e,ref}$ denotes the transport block size of the reference E-TFC; $K_{e,i}$ denotes the transport block size of the $i^{th}$ E-TFC; and Aharq denotes an offset of a Hybrid Automatic Repeat Request (HARQ).

In step 150, the UE may determine if data can be transmitted based on the first gain factor when the serving grant reaches the predetermined value. The value of the serving grant determines the transmission power on E-DPDCH channel, and hence the maximum data rate that can be supported. If data can be successfully transmitted based on the first gain factor, step 180 is then executed for notifying the network of a successful radio link. If the UE fails to transmit data based on the first gain factor, step 160 is then executed.

In step 160, the UE may compute the second gain factor using the interpolation formula (2), wherein, $\beta_{ed,ref,1}$ and $\beta_{ed,ref,2}$ denote the reference gain factors of the primary and secondary reference E-TFCs respectively; $L_{e,ref,1}$ and $L_{e,ref,2}$ denote the number of E-DPDCHs used for the primary and secondary reference E-TFCs respectively; $L_{e,i}$ denotes the number of E-DPDCHs used for the $i^{th}$ E-TFC. $K_{e,ref,1}$ and $K_{e,ref,2}$ denote the transport block sizes of the primary and secondary reference E-TFCs respectively. $K_{e,ref}$ denotes the transport block size of the $i^{th}$ E-TFC; and Aharq denotes an offset of an HARQ. Meanwhile, the UE also starts the timer which provides guard time.

In step 170, the UE may determine if data can be transmitted based on the second gain factor when the timer expires. If data can be successfully transmitted based on the second gain factor, step 180 is then executed for notifying the network of a successful radio link. If the UE fails to transmit data based on the second gain factor, step 180 is then executed for notifying the network of an unsuccessful radio link.

Figure 2:
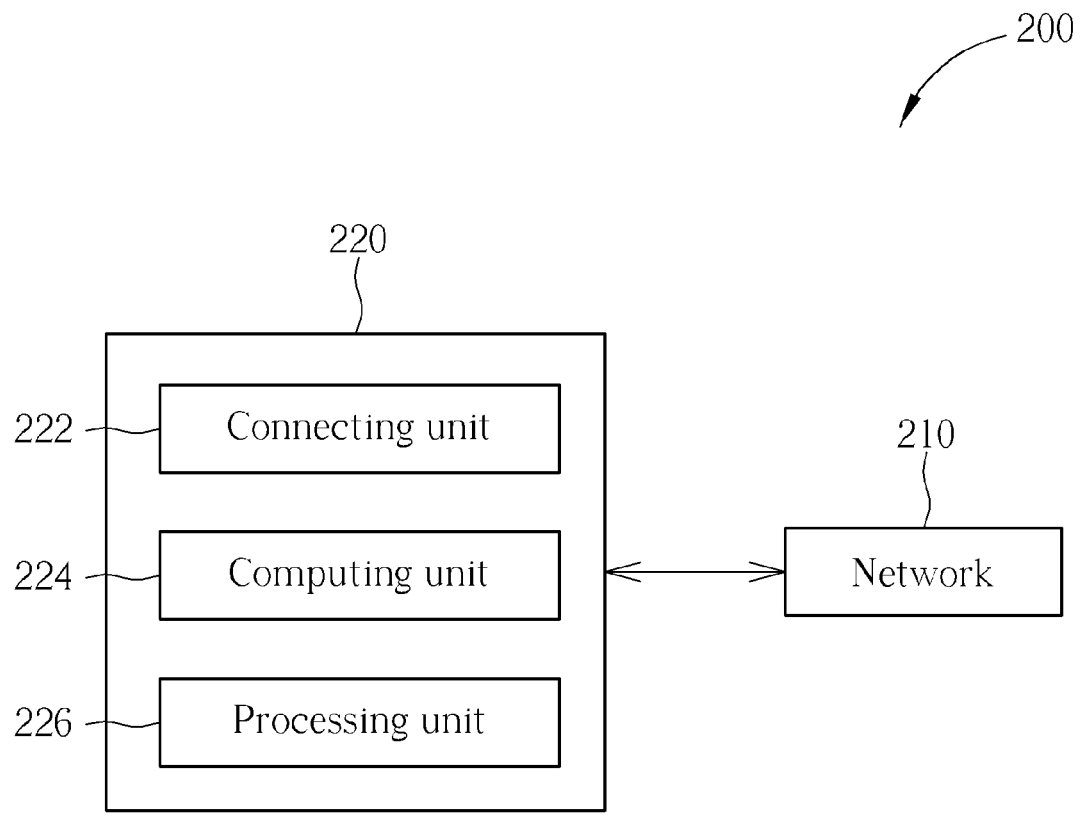
FIG. 2 is a function diagram illustrating a wireless communication system 200 according to an embodiment of the present invention.

FIG. 2 is a function diagram illustrating a wireless communication system 200 according to an embodiment of the present invention. The wireless communication system 200 includes a network 210 and a UE 220 having a connecting unit 222, a computing unit 224 and a processing unit 226. The network 210 may be implemented with any 3GPP-based telecommunication capabilities, such as 2G, 2.5G, 3G or 4G network. The UE 210 may include electronic devices with any 3GPP-based telecommunication capabilities, such as mobile phones, personal digital assistants, handheld computers, tablet computers, nettop computers, or laptop computers. However, the type of the network 210 and the UE 220 does not limit the scope of the present invention.

The connecting unit 222 may include one or multiple modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, UMTS/LTE radio transceiver devices, worldwide interoperability for microwave access (WiMAX) devices, and/or other well-known devices for connecting to other network entities. The connecting unit 222 allows the UE 220 to communicate with the network 210. However, the type of the connecting unit 222 does not limit the scope of the present invention.

The computing unit 224 is configured to acquire the first gain factor using the extrapolation formula (1) and the second gain factor using the interpolation formula (2). However, the type of the computing unit 224 does not limit the scope of the present invention.

The processing unit 226 is configured to execute the present method simultaneously, serially, or otherwise by one processor. For example, the processing unit 226 may execute the determination in step 130, 150 and 170, thereby instructing the connecting unit 220 to execute step 180 or 190. However, the type of the processing unit 226 does not limit the scope of the present invention.

In the present invention, when detecting an inconsistency in the E-DPDCH power interpolation information elements indicated in the RADIO BEARER RECONFIGURATION message and the ACTIVE SET UPDATE message, the UE is configured to compute a first gain factor using an extrapolation formula. If the data cannot be transmitted based on the first gain factor, the UE is configured to compute a second gain factor using an interpolation formula. If the data cannot be transmitted based on the second gain factor, the UE is configured to send a message to notify the network of an unsuccessful radio link. Therefore, the present invention can improve the success rate of radio link by automatically using the extrapolation formula and the interpolation formula for determining transit power for data transmission between the network and the user equipment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining transit power for data transmission between a network and a user equipment, comprising:
   the network sending a first message to the UE, wherein the first message is associated with a radio bearer reconfiguration procedure and includes a first information element associated with an interpolation formula;
   the network sending a second message to the UE, wherein the second message is associated with updating an active set of the user equipment;
   the user equipment computing a first gain factor using an extrapolation formula if the second message does not include a second information element associated with the interpolation formula;
   the UE computing a second gain factor using the interpolation formula if data cannot be transmitted based on the first gain factor; and
   the UE transmitting the data based on the second gain factor.

2. The method of claim 1, wherein:
   the first message is a RADIO BEARER RECONFIGURATION message the defined in a 3rd Generation Partnership Project (3GPP) specification TS 25.331; and
   the second message is an ACTIVE SET UPDATE message defined in the 3GPP specification TS 25.331.

3. The method of claim 2, wherein:
   the first information element is an enhanced dedicated physical data channel (E-DPDCH) power interpolation information element in the RADIO BEARER RECONFIGURATION message defined in the 3GPP specification TS 25.331; and
   the second information element is an E-DPDCH power interpolation information element in the ACTIVE SET UPDATE message defined in the 3GPP specification TS 25.331.

4. The method of claim 1, wherein:
   the extrapolation formula is an E-DPDCH power extrapolation formula defined in a 3rd Generation Partnership Project (3GPP) specification TS 25 (original):214; and
   the interpolation formula is an E-DPDCH power interpolation formula defined in the 3GPP specification TS 25.214.

5. The method of claim 1, further comprising:
the UE transmitting the data based on the first gain factor when a serving grant reaches a predetermined value.

6. The method of claim 1, further comprising:
the UE starting a timer after determining that the data cannot be transmitted based on the first gain factor; and
the UE transmitting the data based on the second gain factor when the timer expires.

7. A wireless communication system for determining transit power, comprising:
a network configured to send a first message and a second message, wherein:
the first message is associated with a radio bearer reconfiguration procedure and includes a first information element associated with an interpolation formula; and
the second message is associated with updating an active set; and
a user equipment comprising:
a connecting unit configured to:
communicate with the network for receiving the first message and the second message; and
transmit data based on a first gain factor or a second gain factor;
a computing unit configured to compute the first gain factor using an extrapolation formula and compute the second gain factor using the interpolation formula; and
a processing unit configured to:
determine if the second message includes a second information element associated with the interpolation formula, the processing unit instructing the computing unit to compute the first gain factor using the extrapolation formula when the second message does not include the second information element associated with the interpolation formula;
determine if data can be transmitted based on the first gain factor when a serving grant reaches a predetermined value, the processing unit instructing the computing unit to compute the second gain factor using the interpolation formula when data cannot be transmitted based on the first gain factor;
determine if the data can be transmitted based on the second gain factor when a timer expires; and
instruct the connecting unit to send a message to notify the network of a successful radio link or an unsuccessful radio link.

8. The wireless communication system of claim 7, wherein:
the first message is a RADIO BEARER RECONFIGURATION message the defined in a 3rd Generation Partnership Project (3GPP) specification TS 25.331; and
the second message is an ACTIVE SET UPDATE message defined in the 3GPP specification TS 25.331.

9. The wireless communication system of claim 8, wherein:
the first information element is an enhanced dedicated physical data channel (E-DPDCH) power interpolation information element in the RADIO BEARER RECONFIGURATION message defined in the 3GPP specification TS 25.331; and
the second information element is an E-DPDCH power interpolation information element in the ACTIVE SET UPDATE message defined in the 3GPP specification TS 25.331.

10. The wireless communication system of claim 7, wherein:
the extrapolation formula is an E-DPDCH power extrapolation formula defined in a 3rd Generation Partnership Project (3GPP) specification TS 25.214; and
the interpolation formula is an E-DPDCH power interpolation formula defined in the 3GPP specification TS 25.214.

* * * * *